: 2,931,728
Patented Apr. 5, 1960

2,931,728

PROCESS FOR PRODUCING A CONCENTRATED COFFEE EXTRACT

George Franck, Forest Hills, and Herbert Guggenheim, Brooklyn, N.Y., assignors to General Foods Corporation, New York, N.Y., a corporation of Delaware No Drawing. Application July 20, 1956
Serial No. 599,009

11 Claims. (Cl. 99—71)

This invention relates to improvements in the production of concentrated coffee extracts.

Dried powder extracts of roasted coffee are substantially lacking in a fragrant aroma such as is present in fresh ground roasted coffee. One procedure which may be employed in attempting to aromatize such powders and the brews of cup coffee prepared therefrom is to distribute throughout the extract oil which has been expressed from roasted coffee, thereby enhancing the extract with the fragrance of the coffee-like aromatic compounds contained in the coffee oil. The residue of coffee material remaining after this coffee oil expressing operation contains considerable water soluble coffee solids in an acceptable condition for providing good cup coffee flavor. Accordingly, it would be economically advantageous if this residue or "coffee meal," as it is referred to hereinafter, could be percolated together with roasted coffee in the production of a concentrated extract which when dried can be marketed as a soluble coffee powder.

However, in the process of expressing the coffee oil, the roasted coffee is subdivided and compressed with the result that a considerable proportion of the coffee meal produced is composed of very fine particles. For example, the coffee meal issuing from a screw or auger type press, i.e., one wherein the screw has flights traveling within a complementary perforated cage or screen concurrent to the feed of coffee to subdivide the coffee and press oil therefrom, has in the order of 50% coffee particles of a size passing a #50 U.S. standard mesh screen.

It is virtually impossible to percolate such expeller cake by itself because of the low porosity of a bed of coffee meal. In handling the coffee meal prior to and during loading a percolation column with other ground roasted coffee, the coffee meal powders or separates freeing the fines, and, together with the fines normally present in the ground coffee, severely reduces the porosity of a coffee bed when it becomes wetted, thus calling for high water pressures to be applied in percolation. Moreover, the fines agglomerated in the coffee meal readily dissociate from their agglomerated condition during percolation thereby further reducing the porosity of a bed of coffee in the percolation chamber. The shifting of fines from a coffee grind alleviates to some extent the high back pressures resulting when coffee meal is employed but not to the degree which assures complete freedom from pressure drop difficulties. For the coffee meal fines distributed in the bed in a column significantly increase the pump pressure required to maintain a desirable velocity for the aqueous solvent in the extraction zone producing a "ram action" which compresses the bed leading to progressively higher back pressures as percolation proceeds. The consequence in many cases, depending upon the quantity of coffee meal percolated, is cessation of percolation before all of the desired solids are extracted from both the coffee meal and the ground coffee.

It is an object of this invention to provide a process whereby coffee meal containing substantial quantities of fine material can have readily extracted therefrom together with other roasted coffee substantially all of the water soluble coffee solids therein without such pressure drop problems and in a condition free of fines and sediments.

It has now been discovered that much of the aforementioned difficulty in percolation of roasted coffee together with substantial quantities of coffee meal fines can be avoided by forming and compressing the coffee meal into pellets having a size substantially larger than the particles of ground coffee and distributing the pellets throughout a column of ground roasted coffee. The coffee meal has blended therewith fines sifted from ground roasted coffee and this blend is pelletized, the pellets being in turn blended with the coarser ground coffee particles and this latter mixture being loaded in a percolation column. Alternatively, the coffee meal can be pelletized separately from ground coffee fines, the latter also being pelletized and the two types of pellets being blended with the coarser ground roasted coffee. Pelletizing is achieved by shaping the fine materials under pressure and preferably by also employing a bonding agent such as moist coffee extract in which case the pressures necessarily employed in pelletizing are lessened as will be explained hereinafter.

Pelletizing immobilizes the fine coffee meal particles in the dry state prior to extraction and positions them in the form of separate masses at spaced points distributed throughout the bed of the coarse coffee particles in the extraction zone. Coffee meal fines remain immobilized as they become wetted in which condition they do not tend to migrate. As a result channeling and packing in the extracting chamber of roasted coffee being percolated is reduced. Compared to extraction procedures not employing coffee meal there is provided a higher concentration of soluble coffee solids in the extract from a given percolation chamber. Moreover, the extract is in a condition substantially free of fines and sediment. The distribution of coffee meal and ground coffee fines in a pelletized form in a column of ground roasted coffee enables the use of a finer grind of coffee to be percolated without troublesome pressure drops and thereby provides a high rate of extraction of soluble coffee solids.

The coffee meal can be pelletized with or without ground coffee fines in accordance with this invention using pressure alone to bind the fine coffee particles together in an immobilized state in the pellet; but preferably the coffee meal has blended therewith a small quantity of moist coffee extract which provides a bond for the meal when it is shaped and dried. Although moist coffee extract is the preferred bonding agent, a number of other non-coffee substances can be employed as bonding agents, viz., polyhydroxy compounds such as higher polyhydric alcohols like sorbitol and mannitol; monosaccharides like the ketones fructose and sorbose; the aldoses glucose and galactose; disaccharides like lactose and maltose; and other polysaccharides. The use of a dried coffee extract or similar bonding agents permits low pressures to be employed in pelletizing the fines thereby avoiding large amounts of heat being developed by the higher pressures otherwise necessary which can impart undesirable flavor to the coffee meal and in turn to the extract therefrom.

In any event, the distribution of the coffee meal fines in the form of relatively large pellets throughout the remaining particles of roasted coffee in the percolator positions the fines in a relatively immobilized state at least in the early percolation cycles and the fines are localized therefore in the voids space between the coarser coffee particles leaving the remaining voids space in a relatively open condition which minimizes clogging and channeling in the extraction chamber.

While the provision of coffee meal in a pellet form in a percolator column also containing ground coffee greatly minimizes pressure drop problems in the column ordinarily encountered in the use of coffee meal, it has also been experienced that a bed of relatively coarse ground roasted coffee which has fines material sifted therefrom and is located in the region for drawoff of the coffee extract reduces to a large extent the pressure drops which can arise at this point. The extract velocity through a given area of the bed increases substantially in the region proximate the drawoff terminal. Consequently, this higher extract velocity tends to cause migration to some extent of even pelletized fines. As a result the fines can build up in the region proximate a drawoff point during percolation leading to high pressure drops in this region. The use of higher water pressures to assure adequate overall extract velocity causes higher pressures to be exerted than are necessary or desirable in regions of the column remote from the drawoff point and thus can reduce the porosity of the bed in such areas. After a few extraction cycles, the benefits of the aforesaid pellet form are lost to the extent that percolation may have to be discontinued at a point where substantial extraction of the water soluble coffee solids has not been obtained.

By employing a "cap" or layer of coarsely ground roasted coffee exclusively at the terminal for drawoff of the coffee extract the advantages of using coffee meal are retained without any disadvantageous pressure drops. In the case of a vertical extracting column having the solvent fed to the bottom of the column this cap is located at the top of the extraction chamber and therefore is loaded into the chamber above a mixture of the aforesaid pellets and ground roasted coffee. This cap acts to compensate for any increase in pressure drop due to fines migrating toward the extraction drawoff terminal during one or more extraction cycles. The importance of such a cap becomes pronounced where a number of extraction chambers are located in series with the extract increasing in concentration as it passes from chamber to chamber. In the last few extracting chambers to contact solvent the rate of increase in coffee solids concentration lessens and the extractability of coffee solids decreases; but the tendency for the extracting chamber to develop undesirable back-pressures increases, tending to cause more packing of the column load and more migration of fines material in the meal toward the top of the column, a condition which is effectively compensated for by the cap of coarse ground roasted coffee. In addition the use of this cap reduces the amount of insoluble fine material found in the final concentrated extract, the dried extract, and of course the brew of cup coffee.

A typical roasted coffee grind for extraction comprises 45% retained on a #12 U.S. standard mesh screen, 45% retained on a #24 screen and about 10% passing the #24 screen. The first two fractions comprise a typical coarse coffee grind fraction as referred to herein. The latter fraction is typical of a fines fraction which preferably is pelletized with the coffee meal. This fines fraction can also be pelletized separately and the pellets blended with coffee meal pellets for percolation with the coarse coffee grind fraction. Pelletizing can be effected by an extruding die, a tableting press or like apparatus capable of shaping the coffee meal while compressing it to immobilize the fines therein. Preparatory to pelletizing the coffee meal it is ground in a hammer mill to break up any agglomerates and facilitate blending with ground coffee fines and coffee extract. The dried extract should constitute from 10–15% by weight of the total blend of extract and fines, and is preferably moistened by steam bled into the mixture. The moistened blend provides a plastic meal which is readily shaped by extrusion through ⅜" die holes or thereabout in an extruder and is cut into pellet lengths in the order of ⅜" to ½". The pellets are cooled and dried in a cyclone air drier to solidify them in which condition they have a "cork-like" appearance.

The pellets produced are substantially dry-to-the-touch and are easily handled without breakage such that they can be uniformly distributed throughout a bed of coarser coffee particles by blending them into a stream of the aforesaid coarse ground coffee fraction as the extraction chamber is filled. Columns have been percolated without troublesome pressure drops where the coffee meal pellets have been combined with the described coarser coffee fraction in the ratio of from 3 to 25% by weight of the coffee column load. Where fines are not sifted from the ground coffee and pellets of only coffee meal are blended with the ground coffee, the level of coffee meal pellets by weight of the coffee column load which can be percolated without pressure drop problems is less.

The quantity and average particle size of ground roasted coffee which should be employed as the aforesaid cap or layer of coarsely ground roasted coffee to minimize the possibility of pressure drop problems stemming from the use of pelletized coffee meal are dependent upon a number of factors. Included among these factors are the shape of the column at the region of drawoff, the extract velocity in this region, diameter and length of the column, and the porosity of the percolator column load containing pelletized coffee meal and ground coffee fines. Hence, the quantity and size of ground roasted coffee particles employed as a cap cannot be stated with any degree of precision due to the number of variables affecting performance in the percolator column; one rule however, which is helpful to follow in this connection is that the velocity in the bed of coarse ground roasted coffee should approximate the extract velocity in a column section containing the ground roasted coffee and the pellets. In the case of a 10" diameter percolator column having a conical upper wall tapering approximately 45° toward the point of drawoff, it has been found that a layer of the aforesaid coarse coffee grind fraction ranging from 5–15% by weight of the total column load of ground roasted coffee and pellets substantially avoids any pressure drop difficulties that might arise from the presence of coffee meal and other fines.

In the present process concentrated coffee extracts are produced which have a coffee character equivalent to that of conventional coffee percolation processes. The process is operative over a wide range of temperature conditions in large size percolator columns. Thus, the process is applicable to commercial scale countercurrent extraction processes employing a series of large diameter tubular columns filled with the pellets and ground roasted coffee.

It will be understood that while the invention has been described in part by means of specific examples reference should be had to the appended claims for a definition of the scope of the invention.

What is claimed is:

1. A process for producing a concentrated coffee extract from ground roasted coffee and coffee meal containing fines by the circulation of water at elevated temperatures through an elongated zone of such ground coffee and coffee meal which comprises forming the coffee meal into pellets having a size substantially larger than the size of the particles of ground coffee, distributing the coffee meal pellets throughout the ground roasted coffee in an elongated extraction zone to immobilize the pelletized coffee meal in separate masses located at spaced points in the extraction zone at least in the initial stages of percolation whereby the fines in said pellets are located in part of the voids space between the ground coffee while leaving the remaining voids space unoccupied, and water extracting the soluble coffee solids from the distributed ground coffee and pellets in said zone.

2. A process according to claim 1, wherein said coffee meal is blended with a bonding agent, and the blend is formed into said pellets.

3. A process according to claim 1, wherein said coffee meal is blended with a quantity of moist coffee extract, and the blend is formed into said pellets.

4. A process according to claim 1, wherein the fines in said ground coffee are separated therefrom and formed into pellets which are distributed throughout the ground roasted coffee.

5. A process according to claim 1, wherein the fines in said ground coffee are separated therefrom, are blended with said coffee meal, and the blend is formed into pellets.

6. A process according to claim 5, wherein said blend has added thereto a bonding agent and is then formed into pellets.

7. A process according to claim 6, wherein the bonding agent is moist coffee extract.

8. A process according to claim 1, wherein a bed of coarse ground coffee exclusively is located in the region proximate the region of drawoff of coffee extract from said zone.

9. The process according to claim 1 wherein the pellets constitute 3 to 25% by weight of the coffee column load.

10. A process according to claim 7 wherein the bed of coarse ground coffee constitutes 5 to 15% by weight of the total column load.

11. A process according to claim 6 wherein the bonding agent employed is dried coffee extract and constitutes 10–15% by weight of the blend of extract and fines.

References Cited in the file of this patent

UNITED STATES PATENTS

| | | |
|---|---|---|
| 1,641,446 | McColl | Sept. 6, 1927 |
| 1,762,690 | Kopf | June 10, 1930 |